Aug. 3, 1965    G. F. GAY ETAL    3,198,260
PIVOTED SHARE ROOT CROP HARVESTER
Filed March 4, 1963    2 Sheets-Sheet 1
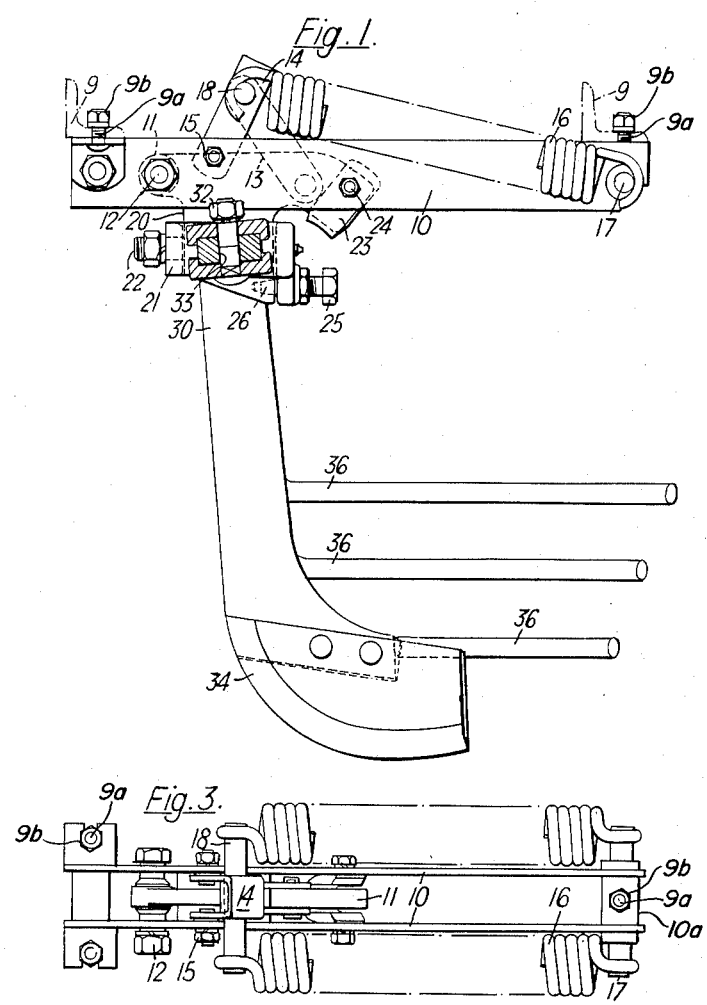

Aug. 3, 1965     G. F. GAY ETAL     3,198,260
PIVOTED SHARE ROOT CROP HARVESTER
Filed March 4, 1963     2 Sheets-Sheet 2
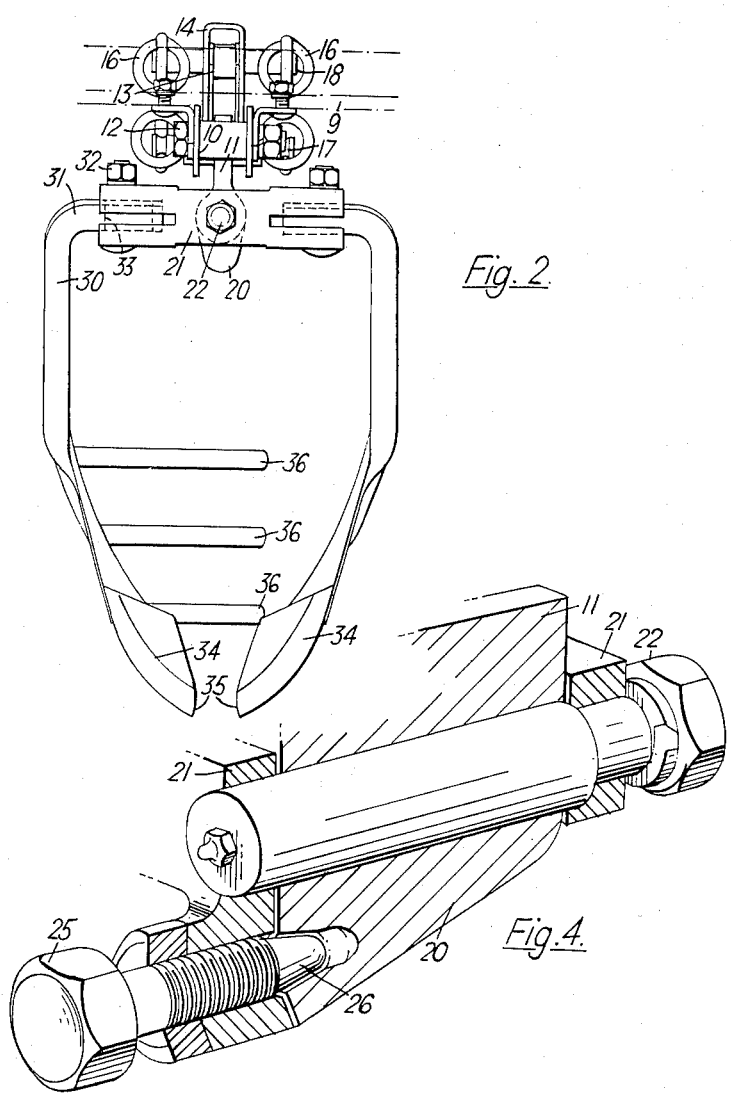

United States Patent Office 3,198,260
Patented Aug. 3, 1965

3,198,260
PIVOTED SHARE ROOT CROP HARVESTER
Georges F. Gay, Creteil, Seine et Oise, and Serge M. Sassier, Paris, Seine, France, assignors to Massey-Ferguson S.A., Paris, France, a corporation of France
Filed Mar. 4, 1963, Ser. No. 262,492
Claims priority, application Great Britain, Mar. 3, 1962, 8,304/62
6 Claims. (Cl. 171—106)

The invention relates to agricultural implements generally and more particularly to implements for harvesting root crops.

One object of the invention is to provide a share assembly for a root crop harvester which is adapted to more effectively engage the roots in the soil, loosen the grip of the soil and apply an uplift to the roots.

Another object is to provide a share assembly in which the shares are mounted in a novel manner to enable them to adjust themselves to effectively grasp roots that are out of alinement with the row being harvested.

Other objects and advantages of the invention will become apparent from the following detailed description of the preferred embodiment illustrated in the accompanying drawings, in which FIGURE 1 is a side view of a share assembly embodying the features of the invention, a detail being in section.

FIG. 2 is a rear view of the share assembly shown in FIG. 1.

FIG. 3 is a top view of the upper portion of the share assembly shown in the preceding figures.

FIG. 4 is a fragmentary sectional view through the longitudinal pivot of the share assembly.

For purposes of illustration, the invention has been shown as embodied in a share assembly suitable for use in a beet harvester. It will be understood, of course, that the illustrative assembly will constitute one of a group of similar assemblies all adjustably mounted on the frame of a beet harvester as, for example, on a cross girder 9, (FIG. 1) constituting one of the main components of the frame of the harvester. In use the assemblies are spaced apart in accordance with the rows of beets to be harvested, the mounting permitting adjustment of the assemblies along the girder to suit the particular row spacing in the different beet fields in which the harvester is to be employed.

Referring to the drawings, each share assembly includes a pair of short, longitudinally disposed side-by-side beams 10 spaced apart by bushings 10a (FIG. 3). These beams are attachable at their forward ends to the supporting girder 9 of the harvester frame in any suitable manner as, for example, by bolts 9a coacting with lugs 9b secured to the beams as shown in FIGS. 1 and 3. A lever 11 disposed between the beams 10 projects below them and is fulcrumed on a bolt 12 bridging the beams. This bolt forms a transverse pivot for the lever 11.

The lever 11 is pivotally connected by links 13 to a yoke 14, the ends of which are attached by coaxial pivot bolts 15 to the beam 10. The yoke is pulled rearwardly by a pair of springs 16 which are anchored to a pin or pins 17 adjacent the rear ends of the beams. The springs at their front end are attached to a transverse pin 18 inserted through suitable openings in the yoke.

The lower portion 20 of the lever 11 has a carrier block 21 pivotally connected to it by a pivot pin 22, the axis of which is longitudinal, that is, which extends generally horizontally fore-and-aft of the harvester. The carrier block may, if desired, be provided with an adjustable striker to cooperate with an adjustable stop on the beams for the purpose of limiting the rearward swing of the lever (that is, counterclockwise as viewed in FIG. 1) against the pull of the springs 16. The forward limit of the range of swing (clockwise) of the lever 11 is, in this instance, determined by a stop 23 which has the form of a stirrup and is bolted at 24 to the beams 10 so as to underlie the rear end of the lever and intercept the same when the lever is swung to the limit position.

The carrier block 21 is pivotable sidewise to the lever 11 about pin 22 to an angular extent determined by a bolt 25. As best seen in FIG. 4, this bolt is screwed to an adjustable extent through the block 21 and has a tapered end 26 which enters more or less a complementary socket in the lower portion 20 of the lever 11. When the bolt is screwed fully home as shown in FIG. 1 so that the end 26 engages tightly in the socket, the carrier block 21 is locked rigidly against the sidewise pivotal movement. As the bolt is screwed out, the carrier block is allowed progressively greater angular movement.

The share supporting members of the exemplary embodiment are shown herein as legs 30. The upper ends 31 of the legs are inturned as shown in FIG. 2 and are respectively clamped by bolts 32 to opposite ends of the carrier block 21. The clamping bolts preferably pass through slots 33 in the block permitting the legs to be spaced apart to any required extent.

Shares 34 are secured to the lower ends of the legs and viewed from the side (FIG. 1) curve rearwards from the legs so that the soil engaging portion of the shares are located rearwardly of the transverse pivot 12 of the lever 11. Viewed from the front or rear (FIG. 2) the shares incline downwardly and inwardly so as to dig below the beets and engage their undersides as the harvester is drawn forwardly. Moreover, the shares 34 converge rearwardly so as to present to the beets a wide front mouth which narrows to a rear throat as shown at 35 in FIG. 2.

In the exemplary embodiment, one of the legs 30 carries a group of curved rods 36 positioned to engage the beet leaves and deflect them sidewise when the harvester is in operation.

In the operation of a harvester equipped with assemblies of the type herein disclosed, the grip of the soil on a beet forces the shares 34 rearwardly (counterclockwise as viewed in FIG. 1) against the yielding pull of the spring 16 when the shares engage a beet. The shares in swinging rearwardly also swing upwardly. Thus, the shares loosen the beet and pull it upwardly from the ground.

Assuming that the bolt 25 is set in a retracted position, a beet out of alinement with the row being harvested when engaged by the shares will swing them to the one side or the other about the pin 22 as a pivot. In other words, the shares will feel out the beet and will adjust themselves sidewise to engage the beets substantially uniformly between them. Thus, the improved share mounting enables the harvester to operate effectively whether the beets are all accurately alined in the row or not and all of the beets are lifted from the ground without damage.

We claim as our invention:
1. A share assembly for a root crop harvester comprising, in combination, a support member connectable to the frame of the harvester, a pair of spaced side-by-side shares mounted on rigidly interconnected share-supporting members depending from said support member and pivotal in a direction transverse to the direction of motion of the harvester, means for limiting pivotal movement of the share-supporting members, said means comprising a tapered screw having a threaded portion engaging with a corresponding threaded aperture in said share-supporting members adjacent their point of interconnection, said tapered screw engaging a recess in a part of said frame which is restrained against transverse pivotal movement, so that the transverse pivotal movement of said shares is variable between a position of maximum movement when said screw is disengaged from said recess and a locked position when said screw is screwed fully home into said recess.

2. A share assembly as claimed in claim 1 in which said screw is disposed in vertical alinement with the axis about which said shares pivot.

3. A share assembly for a root crop harvester comprising, in combination, a support member having means for connection with the frame of a harvester, a lever mounted on said member to pivot about an axis transverse to the path of the harvester, a support block mounted on said lever to pivot about an axis generally horizontal and parallel to the path of the harvester, a pair of root engaging shares mounted on and depending from said support block, and spring means acting on said lever yieldably maintaining said shares in a substantially upright position, the pivot for said lever allowing said shares to swing in a direction to raise an engaged root from the ground, and the pivot for said block allowing said shares to adjust for proper engagement with a root out of alinement with the row being harvested.

4. A share assembly as claimed in claim 3 in which said spring means cooperates with stop means to hold the share-supporting members in said substantially vertical soil-engaging position when the assembly is mounted on the harvester.

5. A share assembly as claimed in claim 3 in which said lever pivots in a substantially vertical plane and has arms extending above and below said support member, said share-supporting block being mounted on one of said arms and said spring means being connected between the other of said arms and a stationary anchorage on the support member.

6. A share assembly as claimed in claim 5 including stop means mounted on the support member, said lever having a further arm engageable with said stop means so as to prevent movement of the share-supporting means beyond the substantially vertical position under the action of the spring means.

References Cited by the Examiner

UNITED STATES PATENTS

| 957,432 | 5/10 | Messer | 172—710 |
| 2,221,765 | 11/40 | Graham et al. | 171—47 X |
| 2,330,743 | 9/43 | Rasmussen et al. | 171—47 |
| 2,690,039 | 9/54 | Olssen | 171—47 |
| 2,777,378 | 1/57 | Hunter | 172—710 |

FOREIGN PATENTS 71,244  4/59  France.
(Addition to No. 1,083,363)

T. GRAHAM CRAVER, *Primary Examiner.*

ANTONIO F. GUIDA, *Examiner.*